Patented June 2, 1931

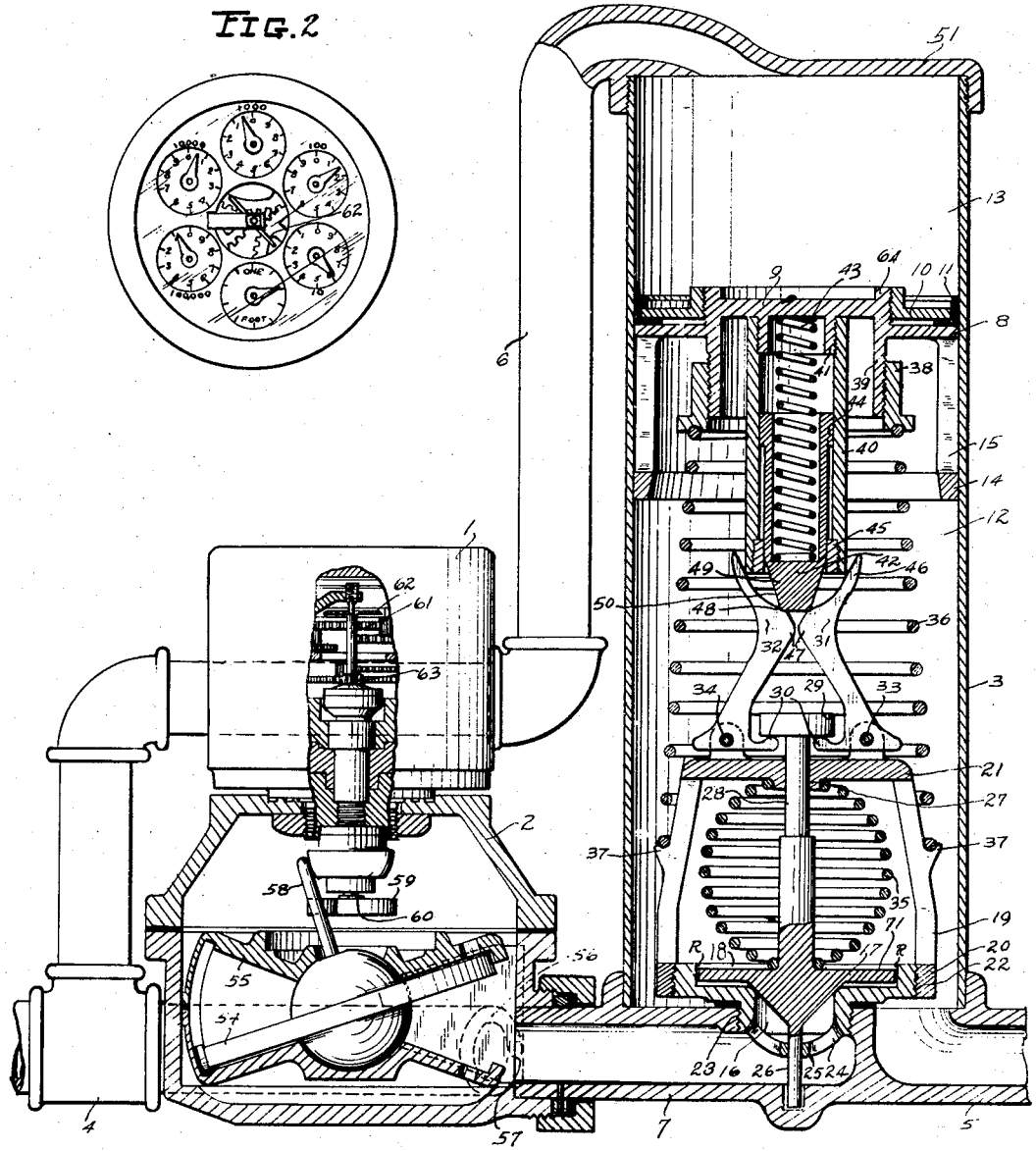

1,808,212

UNITED STATES PATENT OFFICE

GEORGE GOODELL EARL, OF NEW ORLEANS, LOUISIANA

METER

Application filed May 25, 1928, Serial No. 280,483. Renewed October 16, 1930.

My invention relates to fluid flow controllers and relates particularly to a fluid flow controller especially adapted for use in connection with the measuring of water supplied through a meter.

An object of the present invention is to provide for the control of flow of fluid in a fluid system by the positive operation of a valve caused to open at a predetermined pressure at its two sides and to effect maintenance of the valve opening condition for as long as flow continually occurs through the valve opening at above a predetermined rate.

Another object of my invention is to provide for the achievement of the foregoing object and in addition to effect the positive restoration of the closed condition of the valve whenever the rate of flow of fluid through the opened valve becomes less than a predetermined rate of flow.

Relative to the above objects, it is an object of my invention to avoid all irregular actions of the valve which are familiar to those skilled in the art, and known under the adjective terms "chattering", "fluttering", and the like.

Another object is to accomplish quiet operation of a valve of the type above referred to.

Another object is to provide a valve mechanism in the line of flow in a fluid system which will positively control the flow, according to the pressures on its two sides, in an improved manner so as to make it susceptible for use in connection with a water meter which is only capable of registering with a high degree of accuracy, flows passing through it at more than a predetermined rate, and to provide a storage supply of water of the system, between impulses of flow through the meter.

Another object of my invention is to provide for the accurate measurement of fluid flow over a wide range of rates of fluid flow.

Another object is to provide for ready testing of the accuracy and operability of improved apparatus, provided for measurement of fluid flow occurring at varying rates.
Another object is to provide for the measurement of flows occurring over a very wide range of rates of drafts through the apparatus as a whole by the measurement of flows occurring over a very small range of rates of flow through the metering element to accomplish uniformity of percentage of recorded flow to actual flow.

Another object of my invention is to record accurately the whole flow of a fluid through a range of rates of draft from infinitesimal drips to capacity rate through the meter.

Another object of my invention is to increase the accuracy of registration of fluid flow occurring at low rates which in prior mechanisms, with which I am familiar, are either entirely unregistered or, if registered, are registered inaccurately or incompletely.

Another object is to provide a practically operative fluid flow controlling structure of the character described.

Another object of my invention is to provide for controlling a fluid flow in an improved manner.

Another object of my invention is to provide a meter which may be used to accurately measure small flows which may be occurring at very low rates, under practically negligible head or difference of pressure.

Another object is to provide an improved meter of the gulper type hereinafter defined and described which will operate practically noiselessly.

Other objects of my invention and the invention itself will become apparent as the following description of a particular embodiment of my invention progresses and in which description reference will be had to the accompanying drawings forming a part of this specification.

In the drawings:

Fig. 1 illustrates, mostly in longitudinal medial vertical section, an embodiment of my invention.

Fig. 2 is a plan view of the registering mechanism thereof.

Referring now to the drawings, at 1, I show a casing containing a register mechanism, and at 2, I show a casing containing a device operable according to the rate of fluid flow through the casing 2 to actuate the registering mechanism, the register, and actuator therefor, herein illustrated, being preferably of the type specifically disclosed in my copending application for patent, Serial No. 258,339, filed March 1, 1928, to which reference is directed for a more complete description thereof. A registering mechanism of various other well known types may, however, be used.

A fluid supply pipe 4 and a discharge pipe 5 are adapted to introduce and discharge fluid to and from the mechanism. An interconnecting conduit 7 is adapted to receive fluid from the register actuator casing 2 and convey it through a valve port 16 to a fluid storage chamber provided in the lower part of the cylinder 3. A piston 8 is reciprocable in the cylinder, and comprises a piston head 9, with a clamping annulus 10, screw threaded to it, adapted to removably secure an annular cup packing 11, to effect a fluid-tight seal between the fluid storage chamber 12 disposed below the piston head, and the pressure chamber 13 in the cylinder disposed above the piston head. A branch conduit 6 serves to communicate fluid from the conduit 4 to the pressure chamber 13 of the cylinder 3, through its head 51.

An annular guiding skirt 14, having exterior walls in guiding engagement with the interior walls of the cylinder, is spaced from the piston head by a plurality of depending arms 15, two of which only are shown, and which preferably integrally join the skirt co-axially with the head. The skirt serves to maintain the piston in coaxial alignment with the cylinder, to avoid undue friction between the contacting walls of piston and cylinder, which would otherwise restrain reciprocatory movements of the piston, in the cylinder.

A valve 17 controls the ingress of fluid from the conduit 7 into the storage chamber 12. It is mounted in a two-piece valve holder, the base of which comprises a depending exteriorly threaded flange, screw threaded at 23 into the port opening 16, and a peripheral upright annular flange exteriorly threaded at 22 for supporting the ring 20. The ring 20 supports a plurality of spaced upright arms 19 joined together at their upper ends by a centrally perforated disk 21, supported on the arms.

The form of the walls of the valve port inlet passage 16 and the interior walls of the upper annular portion of the valve holder base will be hereinafter described more specifically, but generally will flare downwardly and outwardly toward the bottom of the valve port passage and will support, by webs 24, a bored valve guide 25 for the valve stem 26, which is integrally jointed to and depending axially from the valve 17.

The valve 17 is provided with an upwardly extending valve rod which is projected through the guiding bore 27, of the disc, and terminates in a head 29, disposed above the disc 21.

A pair of like, oppositely disposed levers 31 and 32 are pivotally supported at either side of the valve rod 28, at 33 and 34, respectively, on the disc 21, and comprise inturned radially extending lever arms 30, which project inwardly below the head 29 from their pivots 33 and 34, the arms 30 will effect a lifting action on the valve 17, through the rod 28, to unseat the valve whenever the upwardly extending arms of the levers 31 and 32 are diverged as later described. The compression spring 35, held compressed between the disk 21 and the valve 17, as shown, tends to force the valve towards its seat.

Between the piston 8 and the holder, a convolute spring 36 is interposed, seated at its lower end upon flange projections 37 of the holder arms 19 and engaging at its upper end with an interiorly threaded ring 38, screw threaded onto a depending annular extension 39 of the piston. By rotating the ring 38 on the threaded piston extension, the tension of the spring 36 may be varied for any given position of the piston. Within the annular extension 39, there is disposed a tubular piston stem 40 screw threaded at its upper end onto an annular boss 41 depending from the piston head, and within the stem there is telescoped a plunger 42 and a helical compression spring 43. The plunger is provided at its upper end with a peripheral annular flange 44, and a retaining ring 45 screw threaded into the lower end of the tubular stem 40 prevents the plunger from dropping out of the stem when the piston 9 is in a relatively elevated position in the cylinder, by engaging with the plunger flange 44.

The lever arms 31 and 32 terminate at their upper ends in divergent horns 46, and are bowed inwardly to possible contact at intermediate portions 47, their inner surfaces being divergent above and below the portions 47.

At a small distance above the portions 47, steps or shoulders 48 are provided on each of the levers at the base of the horns 46, and in the position of the levers shown, have horizontally disposed seating surfaces adapted to be engaged by the lateral portions of the horizontally disposed reduced end surfaces of the wedging head 49 of the plunger. The wedging head 49 is provided with converging lateral walls 50 which are engageable with the converging surfaces of the levers 31 and 32 disposed intermediate the shoulders 48 and the lever portions 47, whenever, as will be later described, the levers are preliminarily moved to separate the portions 47 of each, by a pressure engagement of the lower outer edge of the piston stem 40 with the inner inclined surfaces of the lever arm horns 46.

The valve 17 is provided with a centrally disposed depending conical valve portion and an upper radially extending annular flange 71 and the valve holder base 18 above the valve seat, is provided with an annular cylindrical chamber within which the radially extending annular flange 71 may be reciprocated. An annular restriction R is disposed intermediate the peripheral portions of the radial flange and the lateral walls of the enclosing valve chamber portion. This restriction is provided in order to offer a certain amount of resistance to fluid flow at this point to effect a difference of fluid pressure on the two sides of the valve while flow at substantial rates is passing the valve for a purpose herein more fully described.

The registering mechanism as before stated comprises the register disposed within the casing 1 and the actuator mechanism disposed within the casing 2, these may be of any of a number of well known types. I prefer, however, to employ that type of actuator mechanism comprising a universally movable nutating disk 54 disposed within a disk casing 55 to which fluid is admitted at 56 and from which fluid is discharged at 57, the passage of fluid effecting the movement of the end of the actuator rod 58 in a circular path. The rod 58 engages one of the spokes of the wheel 59 secured onto the bottom end of a shaft 60 extending upwardly into the casing 1 and adapted to effect direct co-incidental rotation of the pinion shaft 61 which carries the indicating hand 62. Through a pinion 63 on the shaft 61, the train of toothed wheels of the clockwork, disposed within the casing 1, effect movement of the different hands ordinarily had in a water meter register.

I preferably communicate motion from the wheel 59 to the pinion shaft 61 by virtue of a magnetic clutch device, such as that substantially illustrated and described in my companion application, Serial No. 258,339, filed March 1, 1928, to which reference is had for a more specific description.

In the following description of the operation of the mechanism of my invention, it will be understood that the conduit 4 is directly connected to a water main, supplying water at relatively high pressure, such as 60 pounds per square inch, to the different outlets of a building served by a common conduit 5, and that drafts of water will be occasioned at varying rates according to the demand created at the outlets from time to time, and at first the operation will be described under the assumption that the outlets are all closed except that a certain amount of leakage will exist in the system on the discharge side of the conduit 5 toward the outlets to occasion a drain of water at so low a rate that if passed continuously thru the actuator casing 55, the actuator would fail to be moved at a sufficient rate of speed to properly indicate the amount of leakage flow.

Under the above assumption and with the further assumption that all of the liquid containing passages and chambers are filled with water, and starting the description with the parts disposed in the positions illustrated in the drawings, the valve 17 is seated within the valve opening 16 and water is gradually being withdrawn from the storage chamber 12 in the cylinder 3. With the piston in the position shown, it will be assumed also that this action has been continuing for a sufficient length of time to have moved the piston head 9 from its uppermost position wherein the annular flange 64 engages with the head 51 of the cylinder and that water has meanwhile been discharged through the conduit 5, at a low rate, equal in amount to the volumetric content of the cylinder so far swept out by the downwardly moving piston head 9. The movement of the piston 9 is occasioned by the reduction of fluid pressure in the chamber 12 by gradual withdrawal of water therefrom, and the consequent surplus of fluid pressure exerted on the upper side of the piston 9 by water in the pressure chamber 13, this pressure will always be substantially at the value of pressure in the supplying water main, such as that above assumed to be 60 pounds per square inch. The downward movement will be expedited to some extent by the weight of the piston and supported parts, but it will be opposed by the lifting effect of the spring 36. The spring 36, as a matter of fact, will preferably be made of such a strength as to compensate for the weight of the piston 15 and to supply an excess of pressure, in addition, capable of balancing an excess of fluid pressure of, say, 4 pounds per square inch applied on the upper side of the piston. The spring 35 is made sufficiently strong so that when the valve is closed it would prevent flow through the valve up to, say, 10 pounds per square inch difference of pressure across the valve. The spring 43 is provided for the purpose of accumulating energy while the piston is moving downwardly toward the position illustrated, by being compressed between the wedging head 49 of the plunger and the piston head 9.

Upon further downward movement of the piston 9, the lower outer edge of the piston stem 40 makes engagement with the inner surfaces of the inclined lever arm horns 46, spreading the arms 31 and 32 and effecting a sudden projection of the plunger wedging head 49 between the portions 47 to effect an upward movement of the lever arms 30 to suddenly lift the valve stem 28 by its head 29. This will effect lifting of the valve 17 from its seat and refilling of the storage chamber 12 with water, part of which meanwhile will continue to be discharged at the lower rate from the discharge conduit 5.

while the chamber 12 is being expanded in volumetric content by the restoration of the piston to its uppermost position at the top of the cylinder 3. The upward movement of the piston will be accomplished by the pressure of the spring 36, as soon as the fluid pressure on both sides of the piston becomes nearly equal, due to the relatively free ingress of fluid from the water main via the actuator casing 55 and the valve port 16. The valve 17 will thereupon reclose, by pressure exerted by its spring 35.

During the foregoing operation of the valve, after it is once opened by the energy stored in the spring 43, exerted through multiplying levers 31 and 32 on the valve, the entire area of the lower surface of the valve 17 is subject to the pressure of water on its approach side, entering the storage chamber 12, and its area would be, in a preferred embodiment, about 9 times the area of the valve port 16, so that 1/9 of the fluid pressure which would balance the pressure of the spring 35 when the valve is closed, will be sufficient to prevent the valve from closing after it has moved to open position.

The mechanism comprising the spring pressed plunger 42 and the trigger-released levers 31 and 32 are very important in the operation of the valve 17 during the opening movement of the valve. The arrangement of valve described wherein the valve closes when moved in opposition to the direction of flow operates very well to permit flow through the valve and also to reclose, quietly, but it must be assisted to move to opened position, otherwise an undesirable chattering action will take place. This result is secured in the embodiment illustrated and described by the gradual accumulation of potential energy had during the movement of the piston 8 in a downward direction effecting compression of the spring 43 which is thereby caused to store energy until suddenly, upon the storage of a predetermined amount of energy in the spring, the levers 31 and 32 are thrust apart by the trigger effect of the engagement between the tube 40 and the horns 46, and the valve 17 is moved upwardly with sufficient force to positively overcome any tendency to chatter or otherwise operate irregularly without moving to its fully operated open position, which, in the embodiment illustrated, is insured by the sudden release of the stored energy of the spring.

So long as the flow passing through the valve is enough to require a pressure absorption through the narrow annular space R of more than said 1/9 or in the embodiment described a little over 1 pound difference of pressure across the valve 17, the valve cannot close. When the flow through the valve falls below the predetermined amount for which the annular restriction R, disposed between the outer edge of the piston flange 71 of the valve 17, is designed, the pressure below the valve will fall below that necessary to hold the valve open and the valve will seat, quietly.

Having thus described my invention in a specific embodiment, I am aware that numerous and extensive embodiments of my invention may be had departing from the embodiment herein illustrated and described but not departing from the spirit of my invention.

I claim:

1. In a valve mechanism, in combination a conduit, a valve port therein in the line of flow therethrough, a valve disposed so as to close the port when moved contrary to the direction of the flow therethrough, a fluid storage chamber on the discharge side of the valve, a fluid pressure responsive element comprising a movable wall of the chamber, means to communicate the pressure of fluid in the conduit, at the approach side of the valve, to a side of the wall disposed exteriorly of the storage chamber, counter-balancing means constantly exerting pressure against the wall with a force opposing and fractional to the force exerted thereon by the communicated pressure of fluid, mechanism for moving the valve to opened position comprising a lever and a spring, said wall adapted to increasingly stress said spring when moved in such a direction as to effect a decrease of chamber capacity, and means responsive to a predetermined capacity decreasing movement of said chamber wall, to effect sudden forcible communication of the energy stored in the spring through said lever to the valve to open the valve.

2. In combination with a fluid conduit, a valve mechanism therefor comprising a valve adapted when in closed position to substantially prevent flow through the conduit, a fluid storage chamber communicating with the conduit on the discharge side of the valve, said chamber having a movable wall, means to communicate the pressure of fluid on the approach side of the valve to an exterior side of the said wall, counter-balancing means adapted to exert a counter-pressure upon the wall, to oppose the effect thereon of said communicated pressure, said valve having, when closed, a surface portion exposed to pressure effort of the fluid on its approach side, said valve being movable to open in the direction of the flow, means effective to accumulatively store energy upon a movement of said wall in a direction effective to reduce the volumetric content of the chamber, means operable to effect a relatively sudden communication of the force of the stored energy to the valve to effect a positive lifting effort on said valve upon such movement of said wall as accomplishes a predetermined reduction of content of the chamber, said wall restorable by pressure of fluid admitted to the chamber through the opened valve, and by the cooperative effect of pressure exerted thereon by said counter-balancing means.

3. In a fluid metering system, a valve mechanism therefor comprising a valve adapted when in closed position to substantially prevent flow through the conduit, a fluid storage chamber communicating with the conduit on the discharge side of the valve, said chamber having a movable wall, means to communicate the pressure of fluid on the approach side of the valve to an exterior side of the said wall, counter-balancing means adapted to exert a counter-pressure upon the wall, to oppose the effect thereon of said communicated pressure, said valve having, when closed, a surface portion exposed to pressure effort of the fluid on its approach side, said valve being movable to open in the direction of the flow, means effective to accumulatively store energy upon a movement of said wall in a direction effective to reduce the volumetric content of the chamber, means operable to effect a relatively sudden communication of the force of the stored energy to the valve to effect a positive lifting effort on said valve upon such movement of said wall as accomplishes a predetermined reduction of content of the chamber, said wall restorable by pressure of fluid admitted to the chamber through the opened valve, and by the cooperative effect of pressure exerted thereon by said counter-balancing means, and a fluid flow register interposed in the path of flow through the valve on the approach side of the valve.

4. In combination with a fluid conduit, a valve mechanism therefor comprising a valve adapted when in closed position to substantially prevent flow through the conduit, a fluid storage chamber communicating with the conduit on the discharge side of the valve, said chamber having a movable wall, means to communicate the pressure of fluid on the approach side of the valve to an exterior side of the said wall, counter-balancing means adapted to exert a counter-pressure upon the wall, to oppose the effect thereon of said communicated pressure, said valve having, when closed, a surface portion exposed to pressure effort of the fluid on its approach side, said valve being movable to open in the direction of the flow, means effective to accumulatively store energy upon a movement of said wall in a direction effective to reduce the volumetric content of the chamber, means operable to effect a relatively sudden communication of the force of the stored energy to effect a positive lifting effort on said valve upon such movement of said wall as accomplishes a predetermined reduction of content of the chamber, said wall restorable by pressure of fluid admitted to the chamber through the opened valve, and by the cooperative effect of pressure exerted thereon by said counter-balancing means, said chamber comprising a cylindrical portion, said wall comprising a piston reciprocable in the cylinder.

5. In combination with a fluid conduit, a valve mechanism therefor comprising a valve adapted when in closed position to substantially prevent flow through the conduit, a fluid storage chamber communicating with the conduit on the discharge side of the valve, said chamber having a movable wall, means to communicate the pressure of fluid on the approach side of the valve to an exterior side of the said wall, spring means adapted to exert a counter-pressure upon the wall, to oppose the effect thereon of said communicated pressure, said valve having, when closed, a surface portion exposed to pressure effort of the fluid on its approach side, said valve being movable to open in the direction of the flow, means effective to accumulatively store energy upon a movement of said wall in a direction effective to reduce the volumetric content of the chamber, means operable to effect a relatively sudden communication of the force of the stored energy to effect a positive lifting effort on said valve upon such movement of said wall as accomplishes a predetermined reduction of content of the chamber, said wall restorable by pressure of fluid admitted to the chamber through the opened valve, and by the cooperative effect of pressure exerted thereon by said spring means, and counter-balancing means continuously effective on said valve tending to close the same and holding the valve closed, said valve and the fluid passages adjacent thereto being so formed that upon a predetermined opening movement of the valve, the fluid pressure exerted on its approach side is multiplied during the period starting with the opening of the valve and continuing during flows therethrough occurring at substantial rates.

6. In combination with a fluid conduit, a valve mechanism therefor comprising a valve adapted when in closed position to substantially prevent flow through the conduit, a fluid storage chamber communicating with the conduit on the discharge side of the valve, comprising a cylinder and piston reciprocable therein, means to communicate the pressure of fluid on the approach side of the valve to an exterior side of the said piston, counter-balancing means adapted to exert a predetermined pressure of substantially constant value, upon the piston, to oppose the effect thereon of said communicated pressure, said valve having, when closed, a surface portion exposed to pressure effort of the fluid on its approach side, said valve being movable to open in the direction of the flow, a spring gradually increasingly stressed, upon a movement of said piston in a direction effective to reduce the volumetric content of the chamber, means operable to effect a relatively sudden communication of the force stored in the stressed spring to the valve to effect a positive lifting effort on said valve upon such movement of said piston as accomplishes a predetermined reduction of content of the chamber, said piston being restorable by pressure of fluid admitted to the chamber through the opened valve, and by the cooperative effect of pressure exerted thereon by said counter-balancing means.

7. In combination with a fluid conduit, a valve mechanism therefor comprising a valve adapted when in closed position to substantially prevent flow through the conduit, the valve being movable to open in the direction of flow through the valve opening, a fluid storage chamber communicating with the conduit on the discharge side of the valve, the chamber having a movable wall, means to communicate the pressure of fluid on the approach side of the valve to an exterior side of the said wall, means effective to accumulatively store energy upon a movement of said wall in a direction effective to reduce the volumetric content of the chamber, means operable to effect a relatively sudden communication of the force of the stored energy to the valve to effect a positive opening of the valve upon such movement of said wall as accomplishes a predetermined reduction of content of the chamber.

8. In combination with a fluid conduit, a valve mechanism therefor comprising a valve adapted when in closed position to substantially prevent flow through the conduit, a fluid storage chamber communicating with the conduit on the discharge side of the valve, said chamber having a movable wall, means to communicate the pressure of fluid on the approach side of the valve to an exterior side of the said wall, counter-balancing means tending to oppose the effect thereon of said communicated pressure, said valve having, when closed, a surface portion exposed to the pressure effort of the fluid on the approach side, said valve being movable to open in the direction of flow, means effective to accumulatively store energy upon a movement of said wall in a direction effective to reduce the volumetric content of the chamber, means operable to effect a relatively sudden communication of the force of the stored energy to the valve to effect the positive opening of the valve upon such movement of said wall as accomplishes a predetermined reduction of content of the chamber, said wall being restorable in position by pressure of fluid admitted to the chamber through the opened valve and by the cooperative effect of said counter-balancing means.

9. In combination with a fluid conduit, a valve mechanism therefor comprising a valve adapted when in closed position to substantially prevent flow through the conduit, a fluid storage chamber communicating with the conduit on the discharge side of the valve, comprising a cylinder and piston reciprocable therein, means to communicate the pressure of fluid on the approach side of the valve to an exterior side of the said piston, counter-balancing means for the piston tending to oppose the effect thereon of said communicated pressure, said valve having, when closed, a surface portion exposed to pressure effort of fluid on its approach side, said valve being movable to open in the direction of the flow therethrough, a spring adapted to be increasingly stressed upon movement of said piston in the direction effective to reduce the volumetric content of the chamber, a stop operable to prevent release of the energy in the stressed spring, the stop being adapted to be displaced by movement of the piston to a position effecting a predetermined reduction of content of the chamber, a lever adapted to be moved by energy of the spring thus released and adapted to suddenly open the valve and the piston being restorable to a position of greater chamber content by pressure of fluid admitted to the chamber through the opened valve and by the cooperative effect of said counter-balancing means.

10. In combination with a fluid conduit, a valve mechanism therefor comprising a valve adapted when in closed position to substantially prevent flow through the conduit, a fluid storage chamber communicating with the conduit on the discharge side of the valve, comprising a cylinder and piston reciprocable therein, means to communicate the pressure of fluid on the approach side of the valve to an exterior side of the said piston, counter-balancing means for the piston tending to oppose the effect thereon of said communicated pressure, said valve having, when closed, a surface portion exposed to pressure effort of fluid on its approach side, said valve being movable to open in the direction of the flow therethrough, a spring adapted to be increasingly stressed upon movement of said piston in the direction effective to reduce the volumetric content of the chamber, a stop operable to prevent release of the energy in the stressed spring, the stop being adapted to be displaced by movement of the piston to a position effecting a predetermined reduction of content of the chamber, a lever adapted to be moved by energy of the spring thus released and adapted to suddenly open the valve and the piston being restorable to a position of greater chamber content by pressure of fluid admitted to the chamber through the opened valve and by the cooperative effect of said counter-balancing means, said valve and the fluid passages adjacent thereto being so formed that upon a predetermined opening movement of the valve, the fluid pressure exerted on its approach side is multiplied during the period starting with the opening of the valve and continuing during flows therethrough occurring at substantial rates.

11. In combination with a fluid conduit, a valve mechanism therefor comprising a valve adapted when in closed position to substantially prevent flow through the conduit, a fluid storage cylinder communicating with the conduit on the discharge side of the valve, the cylinder having a movable piston, means to communicate the pressure of fluid on the approach side of the valve to an exterior side wall of the piston, a spring adapted to exert a counter-pressure upon the piston to oppose the effect thereon of said communicated pressure, the valve having, when closed, a surface portion exposed to pressure effort of the fluid on its approach side, the valve being movable to open in the direction of flow, a lever connected to the valve and adapted when moved to open the valve, a spring normally holding the valve in closed position, a lever operating spring, a stop for the spring, the spring being associated with the piston whereby, when the spring engages the stop, movement of the piston in a direction to reduce the volumetric content of the cylinder may store up energy in the spring, means associated with the piston to remove the spring stop and to effect a sudden release of energy of the spring upon movement of the piston to a predetermined position in the cylinder, in the direction to reduce the cylinder content, and means whereby the release spring may move the lever to open the valve, the piston being restorable to a position of increased chamber content by pressure of fluid admitted to the cylinder through the opened valve, and by the cooperative effect of pressure exerted thereon by said spring, the valve and the fluid passages adjacent thereto being so formed that upon a predetermined opening movement of the valve the fluid pressure exerted on its approach side is multiplied during the period starting with the opening of the valve and continuing during flows therethrough occurring at substantial rates.

12. In combination with a fluid conduit, a valve mechanism therefor comprising a valve adapted when in closed position to substantially prevent flow through the conduit, the valve being movable to open in the direction of flow through the valve opening, a fluid storage chamber communicating with the conduit on the discharge side of the valve, the chamber having a movable wall, movable in one direction upon the storage of fluid therein and in the other direction upon the discharge of fluid therefrom into the conduit, means effective to accumulatively store energy upon a movement of said wall in the direction effective to reduce the volumetric content of the chamber, and means operable to effect a relatively sudden communication of the force of the stored energy to the valve to effect a positive opening of the valve upon such movement of said wall as accomplishes a predetermined reduction of content of the chamber.

13. In combination with a fluid conduit, a valve mechanism therefor comprising a valve adapted when in closed position to substantially prevent flow through the conduit, the valve being movable to open in the direction of flow through the valve opening, a fluid storage chamber communicating with the conduit on the discharge side of the valve, the chamber having a movable wall, movable in one direction upon the storage of fluid therein and in the other direction upon the discharge of fluid therefrom into the conduit, means effective to accumulatively store energy upon a movement of said wall in the direction effective to reduce the volumetric content of the chamber, and means operable to effect a relatively sudden communication of the force of the stored energy to the valve to effect a positive opening of the valve upon such movement of said wall as accomplishes a predetermined reduction of content of the chamber, said wall being restorable in position upon the application thereon of pressure of fluid admitted to the chamber through the opened valve.

14. In combination with a fluid conduit, a valve mechanism therefor comprising a valve adapted when in closed position to substantially prevent flow through the conduit, the valve being movable to open in the direction of flow through the valve opening, a fluid storage chamber communicating with the conduit on the discharge side of the valve, the chamber having a movable wall, movable in one direction upon the storage of fluid therein and in the other direction upon the discharge of fluid therefrom into the conduit, means effective to accumulatively store energy upon a movement of said wall in the direction effective to reduce the volumetric content of the chamber, and means operable to effect a relatively sudden communication of the force of the stored energy to the valve to effect a positive opening of the valve upon such movement of said wall as accomplishes a predetermined reduction of content of the chamber, said wall being restorable in position upon the application thereon of pressure of fluid admitted to the chamber through the opened valve, said valve and the fluid passages adjacent thereto being so formed that upon a predetermined opening movement of the valve, the fluid pressure exerted on its approach side is multiplied during the period starting with the opening of the valve and continuing during flows therethrough occurring at substantial rates.

15. In combination with a fluid conduit, a valve mechanism therefor comprising a valve adapted when in closed position to substantially prevent flow through the conduit, the valve being movable to open in the direction of flow through the valve opening, a fluid storage chamber communicating with the conduit on the discharge side of the valve, the chamber having a movable wall, means to communicate the pressure of fluid on the approach side of the valve to an exterior side of the said wall, means to accumulatively store energy upon a movement of said wall in a direction effective to reduce the volumetric content of the chamber, means operable to effect a relatively sudden communication of the force of the stored energy to the valve to effect a positive opening of the valve upon such movement of said wall as accomplishes a predetermined reduction of content of the chamber, and a fluid flow register interposed in the path of flow through the valve on the approach side of the valve.

16. In combination with a fluid conduit, a valve mechanism therefor comprising a valve adapted when in closed position to substantially prevent flow through the conduit, the valve being movable to open in the direction of flow through the valve opening, a fluid storage chamber communicating with the conduit on the discharge side of the valve, the chamber having a movable wall, movable in one direction upon the storage of fluid therein and in the other direction upon the discharge of fluid therefrom into the conduit, means effective to accumulatively store energy upon a movement of said wall in the direction effective to reduce the volumetric content of the chamber, and means operable to effect a relatively sudden communication of the force of the stored energy to the valve to effect a positive opening of the valve upon such movement of said wall as accomplishes a predetermined reduction of content of the chamber, said wall being subjected to pressure of fluid admitted to the chamber through the opened valve in the direction to restore the wall, and counterbalancing means adapted to exert a predetermined pressure of substantially constant value upon the wall in the direction to restore it.

17. In combination with a fluid conduit, a valve mechanism therefor, comprising a valve adapted when in closed position to substantially prevent flow through the conduit, the valve comprising a valve element subjected to fluid pressure in the conduit on both the approach and discharge sides of the valve element, means biasing the valve element to closed position against opening by less than a predetermined difference of pressure on its two sides, and the valve being movable to open in the direction of flow through the valve opening, a fluid storage chamber communicating with the conduit on the discharge side of the valve, the chamber having a movable wall, movable in one direction upon the storage of fluid therein and in the other direction upon the discharge of fluid therefrom into the conduit, mechanism operable by movement of the wall in the direction effective to reduce the volumetric content of the chamber to effect a positive opening of the valve upon such movement of said wall as accomplishes a predetermined reduction of content of the chamber, said valve element and the fluid passages adjacent thereto being so formed that upon a predetermined opening movement of the valve, the force of the pressure on the approach side is multiplied to effect a holding open of the valve at a difference of approach and discharge pressure less than said predetermined difference.

18. In combination with a fluid conduit, a valve mechanism therefor, comprising a valve adapted when in closed position to substantially prevent flow through the conduit, the valve comprising a valve element subjected to fluid pressure in the conduit on both the approach and discharge sides of the valve element, means biasing the valve element to closed position, the valve being movable to open in the direction of flow through the valve opening, a fluid storage chamber communicating with the conduit on the discharge side of the valve, the chamber having a movable wall movable in one direction upon the storage of fluid therein and in the other direction upon the discharge of fluid therefrom into the conduit, mechanism operable by movement of the wall in the direction effective to reduce the volumetric content of the chamber to effect a positive opening of the valve upon such movement of said wall as accomplishes a predetermined reduction of content of the chamber, said valve element and the fluid passages adjacent thereto being so formed that upon a predetermined opening movement of the valve, the force of the pressure on the approach side is multiplied to effect a holding open of the valve element at all differences of pressure corresponding to rates of flow greater than a predetermined rate.

19. In a conduit system, the combination of a casing, a valve adapted to prevent small flows of water through the casing, a compartment in the casing adapted to contain a supply of water to supply water at small rates of draft, a movable member adapted to move responsive to the difference of pressure existing on its two sides, one of said pressures being derived from the water on the approach side of the valve and the other pressure being derived from the water on the discharge side of the valve, means operable by movements of said member to effect an initial opening of the valve whereby the supply of water in the compartment will be renewed, other means responsive to flow through the valve at more than a predetermined velocity and operable to hold the valve open independently of the movement of the member until the rate of flow through the valve takes place at less than a predetermined rate, the valve opening in the direction of flow therethrough.

In testimony whereof I hereunto affix my signature this 26th day of April, 1928.

GEORGE GOODELL EARL.